United States Patent [19]

Dea et al.

[11] 4,219,581

[45] Aug. 26, 1980

[54] ICE CONFECTIONS AND PROCESSES FOR THEIR PREPARATION

[75] Inventors: Iain C. M. Dea; Devamanohari Pillai, both of Bedford, England

[73] Assignee: Thomas J. Lipton, Inc., Englewood Cliffs, N.J.

[21] Appl. No.: 32,435

[22] Filed: Apr. 23, 1979

[30] Foreign Application Priority Data

Apr. 24, 1978 [GB] United Kingdom .............. 16088/78

[51] Int. Cl.$^2$ .............................................. A23G 9/00
[52] U.S. Cl. .................................... 426/565; 426/567
[58] Field of Search ....................... 426/565, 566, 567

[56] References Cited

U.S. PATENT DOCUMENTS

| | | | |
|---|---|---|---|
| 3,993,793 | 11/1976 | Finney | 426/565 |
| 4,127,679 | 11/1978 | Amano et al. | 426/565 |
| 4,146,652 | 3/1979 | Kahn | 426/565 |

*Primary Examiner*—Jeanette M. Hunter
*Attorney, Agent, or Firm*—Brumbaugh, Graves, Donohue & Raymond

[57] ABSTRACT

Hardened stabilized ice cream confections comprise aerated compositions of ice crystals, edible fat particles and aqueous syrupy phase, shear-frozen under aeration, extruded at nozzle temperatures about $-8°$ C. to $-13°$ C., hardened at $-20°$ C. or colder, and contain sugars, sugar alcohols or other low molecular weight materials in amounts molarly equivalent to more than 32% by weight disaccharide, with overruns of 140% or more, and have hardness at $-18°$ C. expressed by log $H = 0.85$ or less: the confections though storable in the deep-freeze, have eating qualities analogous to those of soft-serve ice cream when eaten direct from the deep freeze.

10 Claims, No Drawings

ICE CONFECTIONS AND PROCESSES FOR THEIR PREPARATION

This invention relates to ice cream confections and methods of making them, and concerns improved confection compositions and their preparation.

A large variety of ice confection products is known with a correspondingly wide range of formulations. Several are described in, for example, Great Britian Pat. Nos. 1,456,207; 696,287; and U.S. Pat No. 3,993,793. One popular variant of ice cream is so-called "soft-serve" ice cream. Its preparation is described in, for example, W. S. Arbuckle, "Ice Cream", AVI Publishing Co., 1972, 2nd edition, pp 278–285, 398.

Soft-serve ice cream is prepared and served at −5° to −8° C., and in practice requires preparation and machinery at the place where it is sold and consumed. This need for local preparation is associated with a number of difficulties. For example, it is often hard to ensure adequate microbiological safety standards for the machinery and raw materials. The preparation requires much labour and time. The product has poor keeping qualities: it becomes very hard on deep-frozen storage but at eating temperatures melts down very quickly.

By this invention we provide a stabilized ice cream confection which has been hardened, i.e. equilibrated at deep-freeze temperature, e.g. −20° C. or colder (although hardening can also be carried out at $\leq -25°$ C.), and which, however, at −18° C. possesses a hardness which corresponds to a log H measurement (as hereinafter described) of less than 0.85, preferably 0.75.

We find surprisingly that an ice cream confection according to the invention has organoleptic properties strikingly similar to "soft-serve" ice cream when it is eaten directly from the deep-freeze, i.e. storage at about −18° C. Its "mouthfeel" and texture characteristics when used in this way prove to be acceptable to consumers in a similar way to the acceptability of soft-serve ice cream. The product has the advantage that it can be prepared at a place remote from the point of sale or consumption (thus, also under clean and supervised factory conditions), and it can be stored at convenience, and eaten direct from storage, with retention of its desirable organoleptic properties. Therefore, it represents a new category of frozen confection.

"Ice cream confection", in this context, means a confection composition consisting of an aerated mixture of ice crystals, fat particles and a syrupy aqueous phase, which has been agitated during freezing (i.e. "shear frozen"). Its fat content is below 15% by weight, normally in the range 6–14%, e.g. about 8% by weight.

A variety of parameters of the formulation can be controlled to ensure the hardness characteristic, as mentioned above, which should be (log H) of 0.85 or less, preferably 0.6–0.75 or even less, e.g. 0.5 but greater than 0.1.

The overrun of an ice cream confection according to the invention should preferably be within the range 140–200%, preferably above 145–150%, e.g. 160%–175%. Although overrun >200% can be used, this necessitates extra stabilisation and, hence is not preferred.

We have surprisingly found that in certain embodiments of the invention it helps ready achievement of the desired low hardness degrees to extrude the shear-frozen, aerated ice cream confection at about −10° C. or below, e.g. at colder than −8° C. down to about −13° C., in practice at as low a temperature as can be managed. Otherwise, the physical ice cream processing can be carried out in accordance with the known industrial good practice, e.g. as to homogenisation, pasteurisation, freezing, aeration and extrusion. Conventional ice cream stabilisers such as locust bean gum and carageenan can be used. Furthermore, the ice cream confections according to this invention preferably contain quantities of sugars and/or sugar alcohols or other lowmolecular weight materials, e.g. m.w. $\leq 600$, in quantities molarly equivalent to more than 32% by weight of disaccharide, e.g. above 34% to more than 36%, and for example about 38–43%.

The ice content of the ice cream confections at −18° C. is then preferably less than 46% by weight, often less than 44%, e.g. in the range 41–44%, for example 42%.

Accordingly, the ice cream confections can be conveniently formulated using greater than normal quantities of freezing point depressants such as sugars or sugar alcohols, e.g. sucrose, glucose, fructose, (e.g. as invert sugar), sorbitol and glycerol. Glycerol is a particularly convenient ingredient at, for example, 1–5% by weight of the formulations, though it must be stressed that good results are achieved by the use of the other ingredients mentioned.

The milk or non-milk fat used in these compositions, the sources of non-fat milk solids, and other optional additives and flavourants (e.g. fruit or other dessert materials), are capable of conventional variation, form no part of the novelty of the present invention, and need no further description.

It can be seen that many of the stabilised ice cream compositions according to the present invention are aerated compositions of ice crystals, edible fat particles and aqueous syrupy phase, which have been shear-frozen under aeration, extruded at nozzle temperatures in the range −8° C. to −13° C. and hardened (equilibrated) at −20° C. or colder, and contain sugars and/or sugar alcohols and/or other low molecular weight materials of m.w. $\leq 600$ in amounts molarly equivalent to more than 32% by weight of disaccharide ($C_{12}H_{22}O_{11}$), with overruns of 140% or more, and at −18° C. exhibit hardnesses of log H=0.85 or less, (when the log H measurement isdefined and performed as described below).

Accordingly the invention also provides a process for preparing an ice cream confection, which comprises shearfreezing an aqueous confection mix containing dispersed edible fat and sugars and/or sugar alcohols and/or other low molecular weight materials of m.w. $\leq 600$ in amounts molarly equivalent toa concentration of disaccharide greater than 32% by weight, aerating the mix to an overrun of at least 140%, and hardening the extruded ice cream at −20° C. or colder, to produce a hardened ice cream confection having a hardness corresponding to log H−0.85 or less.

Log H, as defined in this specification, isthe logarithm (base 10) of a hardness measure obtainable by the following or an equivalent test method.

APPARATUS

The Instron

The log H measurements were carried out using the Instron Universal Texture Tester model 1122 (Trade Mark). The sensing table on the Instron was enclosed by a thermostatically controlled temperature cabinet, which operated between a temperature range of +200°

C. and −70° C. The colder temperatures were obtained by cooling the cabinet with liquid Nitrogen, contained in a self pressurising 50 liter Dewar, which was connected to the back of the cabinet. The ice cream samples could therefore be tested in a temperature controlled environment at any desired temperature. The cabinet was modified to enable easy removal of the load cell. It was also fitted with a glass window panel so that observation of the sample deformation etc. during the measurements was possible.

MEASUREMENT

The hardened ice cream samples were tempered in a −18° C. cold room for at least 24 hours before any measurements were carried out. The samples were 40 mm thick. Samples were duplicated. Measurements were only carried out when the sample temperature was within ±0.2° C. of −18° C., as measured with a standard Comark (Trade Mark) temperature probe.

The sample of ice cream was placed on a platform, which was secured to the sensing table of the Instron with Vaseline, to prevent movement during measurement. The platform contained a "hole" (diameter 31.5 mm) through which the core of the ice cream was forced out as a plunger (diameter 29.46 mm) was pushed through the ice cream at a rate of 20 mm/min. As the plunger moved through the ice cream a shear force (in Newtons) was recorded on the Instron trace. H is the maximum force recorded, and is conveniently quoted as a logarithm, log H.

Particular and non-limitative embodiments of the invention will be illustrated further by the following Examples.

EXAMPLE 1

An ice cream confection was formulated as follows:

| | % (weight) |
|---|---|
| Spray-dried milk powder | 9.42 |
| Whey powder | 1.11 |
| Sucrose | 14.12 |
| Glycerol | 5 |
| Maltodextrin (40 DE) | 2.82 |
| Butter | 7.45 |
| Mono/Di-glycerides of palm oil | 0.45 |
| Locust bean gum | 0.2 |
| Carragel MS 20 (Trade Mark, from Bulmers) (Carrageenan) | 0.03 |
| Dairy colour and flavour | 0.035 |
| Water | to 100 |

The processing followed conventional good practice except for the following processing conditions:
Overrun=170%;
Extrusion temperature=−12° C.
After the extruded product had been hardened at −20° C. overnight, measurement as described above showed that its log H at −18° C. was 0.70±0.02.

The product of the Example had good stability and was a firm hardened ice cream after deep-freeze storage, but its softness (log H=0.70) was such that it had the organoleptic qualities of soft-serve ice cream directly on consumption from the deep-freeze, with good mouthfeel, flavour and texture characteristics.

EXAMPLES 2–4

Further ice cream confections were prepared as in Example 1 but formulated as follows:

| Example No.: | 2 | 3 | 4 |
|---|---|---|---|
| Spray dried skim milk powder | 9.42% | 9.42% | 11.84% |
| Whey powder | 1.1% | 1.1% | — |
| Sucrose | 14.12% | 14.12% | 12% |
| Glycerol | 3% | 1% | 1% |
| Dextrose monohydrate | 3% | 6% | 7% |
| Maltodextrin (40 DE) | 2.82% | 2.82% | — |
| Coconut oil | 8% | 8% | 8% |
| Mono/Diglycerides of palm oil (Admul MGP, Food Industries Ltd., Bromborough, England) | 0.45% | 0.45% | 0.45% |
| Locust bean gum (LBG) | 0.2% | 0.2% | 0.2% |
| Carrageenan (Carragel MS 20) (Trade Mark) | 0.03% | 0.03% | — |
| Dairy colour and flavour | 0.03% | 0.03% | 0.03% |
| Water | to 100% in each case | | |

The textural and organoleptic results in each case were acceptably similar to those obtained in Example 1: overruns used were 160%–170%, extrusion temperatures −10° to −12° C., and hardness levels obtained correspond to log H in the range 0.7–0.8.

EXAMPLES 5 and 6

Further ice cream confections were prepared as in the preceding Examples 2–4 but formulated as follows:

| Example No.: | 5 | 6 |
|---|---|---|
| Spray dried skim milk powder | 12% | 9.42% |
| Whey powder | 1.5% | 1.11% |
| Sucrose | 15% | 14.12% |
| Fructose | 2% | — |
| Dextrose monohydrate | 3% | — |
| Corn syrup (40 DE) | 4.5% | 2.82% |
| Glycerol | — | 2% |
| Invert sugar (75% solids) | — | 5.36% |
| Coconut oil | 8% | 8% |
| Mono/Diglycerides of palm oil | 0.45% | 0.45% |
| Locust bean gum (LBG) | 0.2% | 0.2% |
| Carrageenan | 0.03 | 0.03% |
| Dairy colour and flavour | 0.03 | 0.03% |
| Water | to 100% in each case | |

Similar textural and organoleptic results were obtained to those of Examples 2–4.

We claim:

1. A hardened stabilized ice cream confection comprising an aerated composition of ice crystals, edible fat particles and an aqueous syrupy phase, which has been shear-frozen under aeration, extruded at a nozzle temperature in the range about −8° C. to about −13° C., and hardened at a temperature at least as cold as about −20° C.; said composition having an overrun of about 140%–200%; containing edible low molecular weight compounds selected from the group consisting of sugar, sugar alcohols and glycerol of molecular weight at most 600 in an amount molarly equivalent to more than about 32% by weight of the composition of disaccharide ($C_{12}H_{22}O_{11}$); and characterised by a hardness which corresponds to a measure on the log H scale of at most about 0.85.

2. An ice cream confection according to claim 1, wherein said hardness corresponds to a measure on said log H scale of at most 0.75.

3. An ice cream confection according to claim 1, wherein said hardness corresponds to a measure on said log H scale in the range 0.6 to 0.75.

4. An ice cream confection according to claim 1, which has an overrun in the range about 150–175%.

5. An ice cream confection according to claim 1, wherein said low molecular weight compounds are selected from the group consisting of fructose, invert sugar, sorbitol and glycerol, in an amount molarly equivalent to about 34%–43% by weight disaccharide ($C_{12}H_{22}O_{11}$).

6. An ice cream confection according to claim 1, which has an ice content less than 46% by weight at $-18°$ C.

7. An ice cream confection according to claim 6, which has an ice content in the range about 41%–44% at $-18°$ C.

8. A hardened stabilized ice cream confection which has a hardness which corresponds to a measure on the log H scale of at most about 0.85.

9. A process of producing a hardened stabilized ice cream confection which comprises shear-freezing under aeration a composition consisting of edible fat particles and an aqueous syrupy phase containing edible low molecular weight compounds selected from the group consisting of sugar, sugar alcohols and glycerol of molecular weight at most 600 in an amount molarly equivalent to more than about 32% by weight disaccharide ($C_{12}H_{22}O_{11}$); extruding said shear-frozen composition at a temperature in the range about $-8°$ C. to about $-13°$ C. at an overrun of about 140%–200%; and hardening said shear-frozen extruded composition at a temperature at least as cold as about $-20°$ C. to a hardness corresponding to a measure on the log H scale of at most about 0.85.

10. A process according to claim 6 in which the ice content of the hardened composition at $-18°$ C. is less than 46% by weight.

* * * * *

UNITED STATES PATENT AND TRADEMARK OFFICE
CERTIFICATE OF CORRECTION

PATENT NO. : 4,219,581
DATED : August 26, 1980
INVENTOR(S) : Dea et al.

It is certified that error appears in the above—identified patent and that said Letters Patent is hereby corrected as shown below:

Col. 1, line 10, "Britian" should read --Britain--;

Col. 2, line 45, "isdefined" should read --is defined--;

Col. 2, line 52, "toa" should read --to a--;

Col. 2, line 58, "isthe" should read --is the--;

Col. 4, lines 39 & 40, "0.03" should read --0.03%--;

Col. 6, line 14, "claim 6" should read --claim 9--.

Signed and Sealed this

Third Day of February 1981

[SEAL]

Attest:

RENE D. TEGTMEYER

Attesting Officer    Acting Commissioner of Patents and Trademarks